B. F. SHAW.
Gearing for Changing the Speed of Rotating Shafts.

No. 224,045. Patented Feb. 3, 1880.

Witnesses.
Jos. P. Livermore
N. E. C. Whitney.

Inventor.
Benj. F. Shaw
by Crosby & Gregory
Attys

N. PETERS, PHOTO-LITHOGRAPHER, WASHINGTON, D. C.

UNITED STATES PATENT OFFICE.

BENJAMIN F. SHAW, OF LOWELL, MASSACHUSETTS.

GEARING FOR CHANGING THE SPEED OF ROTATING SHAFTS.

SPECIFICATION forming part of Letters Patent No. 224,045, dated February 3, 1880.

Application filed November 17, 1879.

*To all whom it may concern:*

Be it known that I, BENJAMIN F. SHAW, of Lowell, county of Middlesex, State of Massachusetts, have invented an Improvement in Gearing for Changing the Speed of Rotating Shafts, of which the following description, in connection with the accompanying drawings, is a specification.

My invention relates to improvements in mechanism for the transmission of rotary motion, and is shown embodied in a pulley, gear, or equivalent device having a rotary motion, and its shaft and connecting mechanism, whereby the pulley or gear may run freely upon the shaft without rotating it, or may engage and rotate it at times with the same speed or angular velocity as that of the said pulley, and at other times with a greater angular velocity.

Figure 1:
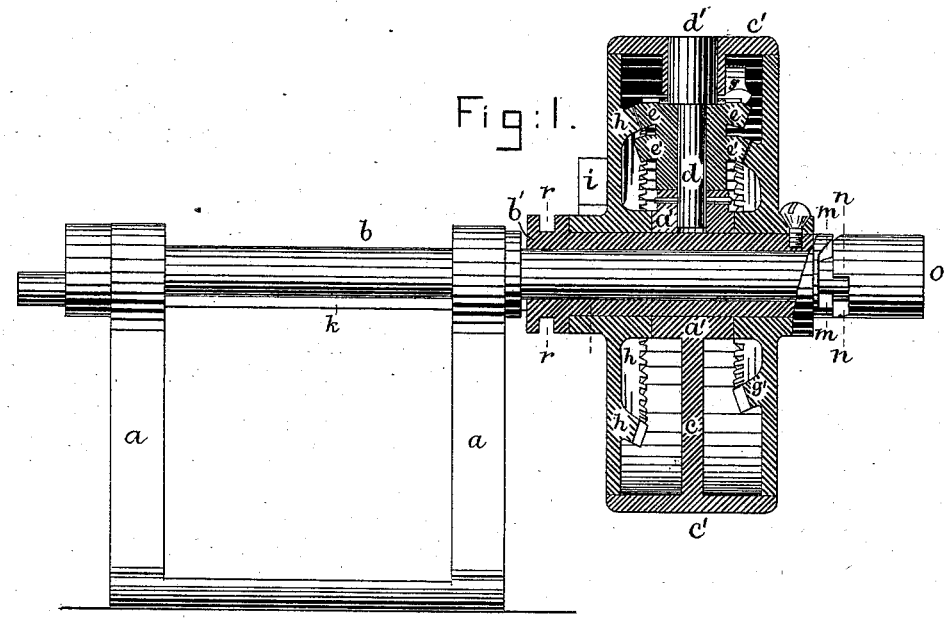
Figure 2:
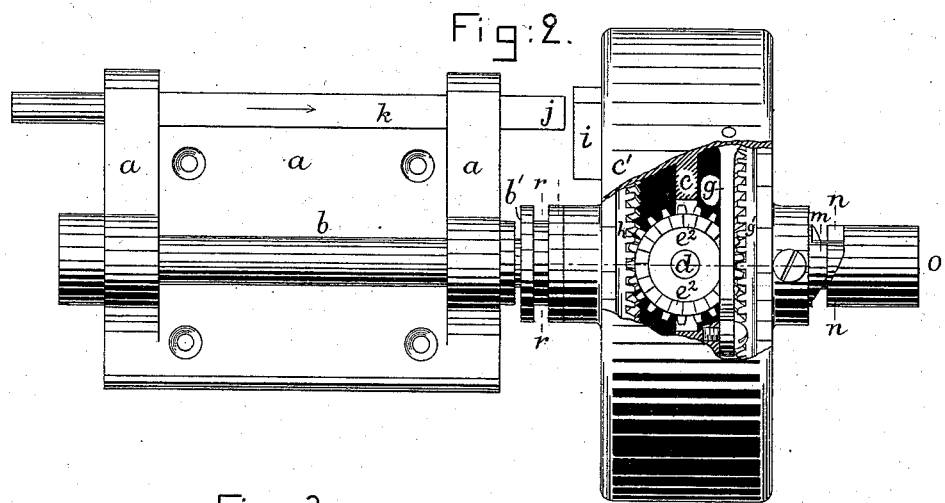
Figure 3:
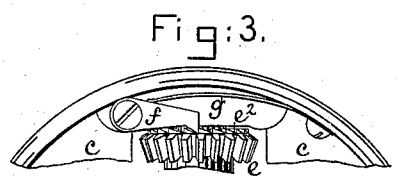

Figure 1 is a longitudinal section of a belt-pulley and accessories embodying my invention, mounted upon a shaft, the parts being so constructed that the shaft may be rotated at the same angular velocity as the pulley or with a greater angular velocity. Fig. 2 is a top view thereof with part of the pulley broken away to show the internal mechanism; Fig. 3, a detail view, showing the ratchet; and Fig. 4, a sectional view, showing a modification, in which the high speed imparted to the shaft by the pulley is just double the low speed.

The frame-work $a$ of the machine has a shaft, $b$, upon which is a loose sleeve, $b'$, carrying a collar, $a'$, free to turn upon the said sleeve, and provided with a stud, $d$, which serves as the axial bearing of the intermediary bevel-gears, $e$ $e'$, which are so connected as to rotate in unison, they being held in working position by the head $d'$ of the said stud.

The collar $a'$ is connected by a web, $c$, with the rim of the pulley $c'$, the collar, web, rim, stud $d$, and intermediaries $e$ $e'$ being all adapted to be revolved together upon the sleeve $b'$.

The outer side of the intermediary gear $e$ is provided with ratchet-teeth $e^2$, for engaging the pawl $f$, which pawl, seated by the spring $g$, prevents the movement of the intermediary gears by the resistance of the work of the machine opposed through the gear $g'$, secured to and rotating with the sleeve $b'$.

At one end of the sleeve $b'$, and engaging the intermediary $e$, is the beveled gear $h$, loose upon the said sleeve $b'$. This gear is provided with the lug $i$, through whose contact with the end $j$ of the sliding bar $k$ it is stopped. At the other end of the sleeve $b'$ is the bevel-gear $g'$, rigidly fixed thereto and rotating therewith.

The sleeve $b'$ has upon its outer end clutch-teeth $m$, to be engaged by clutch-teeth $n$ of the hub $o$, attached to the shaft $b$, the sleeve being provided at its other end with a suitable shipping-lever, which, placed in groove $r$, will move the said sleeve into and out of engagement with hub $o$, so that the pulley may in the one case give motion to the shaft $b$, and in the other case run loosely thereon, as desired.

While the gear $h$ is held by the bar $k$, the intermediaries $e$ $e'$, carried around bodily by the pulley, turn upon the stud $d$, in consequence of the engagement of the teeth of $e$ with those of the now stationary gear $h$. In thus turning upon its own axis while it is revolved with the pulley around the shaft $b$, the intermediary $e'$ imparts to the gear $g'$ and connected sleeve $b'$ a speed exceeding that of the pulley.

Figure 4:
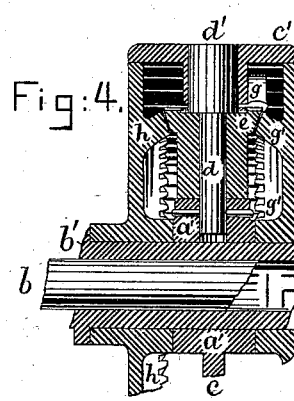

In the construction shown in Fig. 4, (the two side gears being of the same size,) a single intermediary is used, and the increase of speed is one hundred per cent.—*i. e.,* the speed is doubled.

Upon the liberation of the gear $h$ the pawl and ratchet of the intermediary or intermediaries prevent the latter from turning away from the resistance opposed by the work through the gear $g'$, and thus practically lock, for the time being, the gear $g'$ to the pulley $c'$, and compel it to revolve at the speed of the pulley $c'$.

In the construction shown in Fig. 2 the two intermediaries have the same number of teeth, while the gear $h$ has a greater number than the gear $g'$. Consequently the speed of rotation of said gear $g'$ and the connected sleeve $b'$ and shaft $b$, clutched thereto, will be more than double that of the pulley.

By properly proportioning the gears $g'$ $h$ and intermediaries any desired ratio of speeds may be attained between the pulley and its shaft.

It is obvious that by leaving out the sleeve $b'$ and fixing the stud $d$ rigidly to the shaft, the two gears $g'$ and $h$ being loose thereon, and providing clutch-teeth for the outer end of the hub of gear $g'$ to drive the machine, the shaft itself may be used to impart the motion to the said clutch, in which case it will impart no motion to the machine to be driven, if the clutch be disconnected, or it will give the speed due to its own movement if the lug $i$ be free, or a different speed if the lug $i$ be held stationary.

It is also obvious that a fixed pin or bearing may be substituted for the rotating shaft, the power in this case being applied to the pulley $c'$, and thence, through gear $g'$, to the machine, to be driven by means of a clutch on its hub or any other suitable interposed device.

It will be observed that when the gears upon either side of the intermediaries are of one size the higher speed of two to one will be obtained, whether the one or the other of these gears be chosen as the track; and either the one or the other may be chosen, the pawl and ratchet to be obviously made to conform.

In order to obtain a ratio of speed other than two to one, I introduce two intermediary gears of different sizes, as shown in Fig. 1; and I may change the construction still further by making the intermediaries also of different sizes.

In the construction shown in Figs. 1 and 4 the gear to be made the track is the left-hand one, $h$.

In order to calculate the speed to be imparted by my invention, I will denominate gear $h$ as the "stationary gear," gear $e$ as the "receiving-gear," and gear $g'$ as the "propelling-gear."

In my construction, to ascertain the speed, add to the speed of the belt-surface (which is unit or 1) $h \times e' \div (e \times g')$, or divide by $e$ the product of $h$ multiplied by $e'$, divide the quotient thus obtained by $g'$, and add 1 to this quotient. The result multiplied by the actual speed of the belt-surface gives the speed of the shaft.

To determine what must be the relative sizes of the gears to obtain any desired speed, make a sketch of the nest of gears, so as to be enabled to clearly assign values or diameters to them. Divide the number of revolutions desired for the shaft by the number of revolutions to be given the pulley-face per minute. From this quotient deduct 1. Assign a diameter to $g'$, and multiply by this the remainder just found; assign a diameter to $e$, and multiply by this the product just previously obtained; assign a diameter to $e'$, and divide the last previous product by this. The quotient will be the required diameter of $h$.

In an application filed by me May 26, 1879, for patent for improvement in knitting-machine, I have shown one practical use of this invention; but in the said application claim is not made broadly to the mechanical movement, as in this application.

I claim—

1. A shaft or bearing, a loose bevel-gear thereon, a stop to arrest its rotation when desired, a collar provided with a stud and loose intermediary gear thereon, adapted to be turned on the stud in but one direction, and a second bevel-gear intermeshing with the intermediary gear upon the said stud, the said parts being combined, situated, and controlled substantially as described, whereby, while the intermediary gearing is being revolved bodily around the axis of said shaft or bearing one of the said bevel-gears meshing with it will be driven at the speed of the intermediary bevel-gearing about the said shaft or bearing so long as the other bevel-gear intermeshing with the intermediary gearing is free to turn, and at a faster or higher rate of speed when the latter gearing is held by the stop, as described.

2. In a device for transmitting rotary motion, a rotatable shaft, a loose sleeve carried thereon, and two bevel-gears (one fixed and one loose) on said sleeve, a system of intermediary gear fixed between the bevel-gears, and a self-acting stop to prevent said system of intermediary gear from rotating in more than one direction, combined with a movable bar or stop adapted to engage and hold in fixed position when desired one of the said beveled gears, substantially as and for the purpose described.

3. In a device for transmitting rotary motion, the following elements: a rotating shaft, a sleeve loose thereon, adapted to engage the shaft when desired, a gear, $h$, loose on said sleeve and provided with a lug to arrest its motion when desired, a collar loose on said sleeve and provided with a stud carrying an intermediary gear adapted to rotate only in one direction and intermeshing with the loose gear, and a gear rigidly connected with the loose sleeve, which gear, $g'$, intermeshes with an intermediary rigidly connected and rotating on the same stud, $d$, with the intermediary engaging the loose gear $h$, substantially as described.

In testimony whereof I have signed my name to this specification in the presence of two subscribing witnesses.

BENJAMIN F. SHAW.

Witnesses:
 JOSHUA N. MARSHALL,
 ISAAC S. DALY.